United States Patent
Assow

(10) Patent No.: US 6,438,009 B2
(45) Date of Patent: Aug. 20, 2002

(54) REDUCING VOLTAGE TRANSIENTS ACROSS A MOSFET IN A SYNCHRONOUS RECTIFIER IN A DC/DC CONVERTER

(75) Inventor: Bengt Assow, Norsborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/813,281

(22) Filed: Mar. 21, 2001

(30) Foreign Application Priority Data

Mar. 24, 2000 (SE) .............................................. 0001055

(51) Int. Cl.$^7$ ............................................. H02M 7/217
(52) U.S. Cl. ........................ 363/127; 363/21.14; 363/89
(58) Field of Search .............................. 363/127, 21.14, 363/21.16, 81, 84, 89, 125

(56) References Cited

U.S. PATENT DOCUMENTS

| | | | |
|---|---|---|---|
| 5,920,475 A | * | 7/1999 | Boylan et al. .............. 363/127 |
| 5,946,207 A | | 8/1999 | Schoofs ....................... 363/127 |
| 6,243,278 B1 | * | 6/2001 | Jacobs ......................... 363/127 |
| 6,285,175 B1 | * | 9/2001 | Massie ....................... 323/290 |
| 6,304,463 B1 | * | 10/2001 | Krugly .................... 363/21.06 |

FOREIGN PATENT DOCUMENTS

| | | |
|---|---|---|
| EP | 0 184 963 A2 | 6/1986 |
| WO | 99/52200 A1 | 10/1999 |

* cited by examiner

*Primary Examiner*—Adolf Deneke Berhane
(74) *Attorney, Agent, or Firm*—Nixon & Vanderhye P.C.

(57) ABSTRACT

A MOSFET is used as a synchronous rectifier in a fly-back DC/DC converter and connected in series with a secondary winding of a transformer. The MOSFET is repetitively turned on and off in response to the turning off and on of a primary switch connected in series with a primary winding of the transformer. Circuit elements on the secondary winding side detect voltage transients across the MOSFET caused by reverse currents when it is turned off and shorten at least a next on-period of the MOSFET in response to the detection of such transients.

10 Claims, 2 Drawing Sheets

REDUCING VOLTAGE TRANSIENTS ACROSS A MOSFET IN A SYNCHRONOUS RECTIFIER IN A DC/DC CONVERTER

TECHNICAL FIELD

The invention relates generally to DC/DC converters, and more specifically, to a method and an arrangement for controlling synchronous rectifiers in DC/DC converters.

BACKGROUND OF THE INVENTION

To rectify high frequency AC voltages in switched DC/DC converters, synchronous rectifiers in the form of MOSFETs are often used instead of diodes. Since the voltage drop across a MOSFET is lower than across a diode, the efficiency of converters with MOSFETs will be higher. However, since a MOSFET cannot be turned off instantaneously, its turn-off will not occur at exactly the same moment as the turn-on of a primary switch but a little later. This will cause reverse currents through the MOSFET, causing voltage transients to appear across the MOSFET. To eliminate these voltage transients, unique control signals are needed for the MOSFET to function properly. It is known to provide these control signals from the primary side of the converter, e.g. via an additional transformer.

SUMMARY OF THE INVENTION

An object of the invention is to control a MOSFET on the secondary side without any need of transferring control signals from the primary side of the converter. Voltage transients across the MOSFET caused by reverse currents when it is turned off are detected. At least a next on-period of the MOSFET is shortened in response to the detection of such transients. As a result, the MOSFET will be controlled more accurately, and transients are eliminated.

BRIEF DESCRIPTION OF THE DRAWINGS

The invention will be described more in detail below with reference to the appended drawing on which

DETAILED DESCRIPTION OF THE INVENTION

Figure 1:
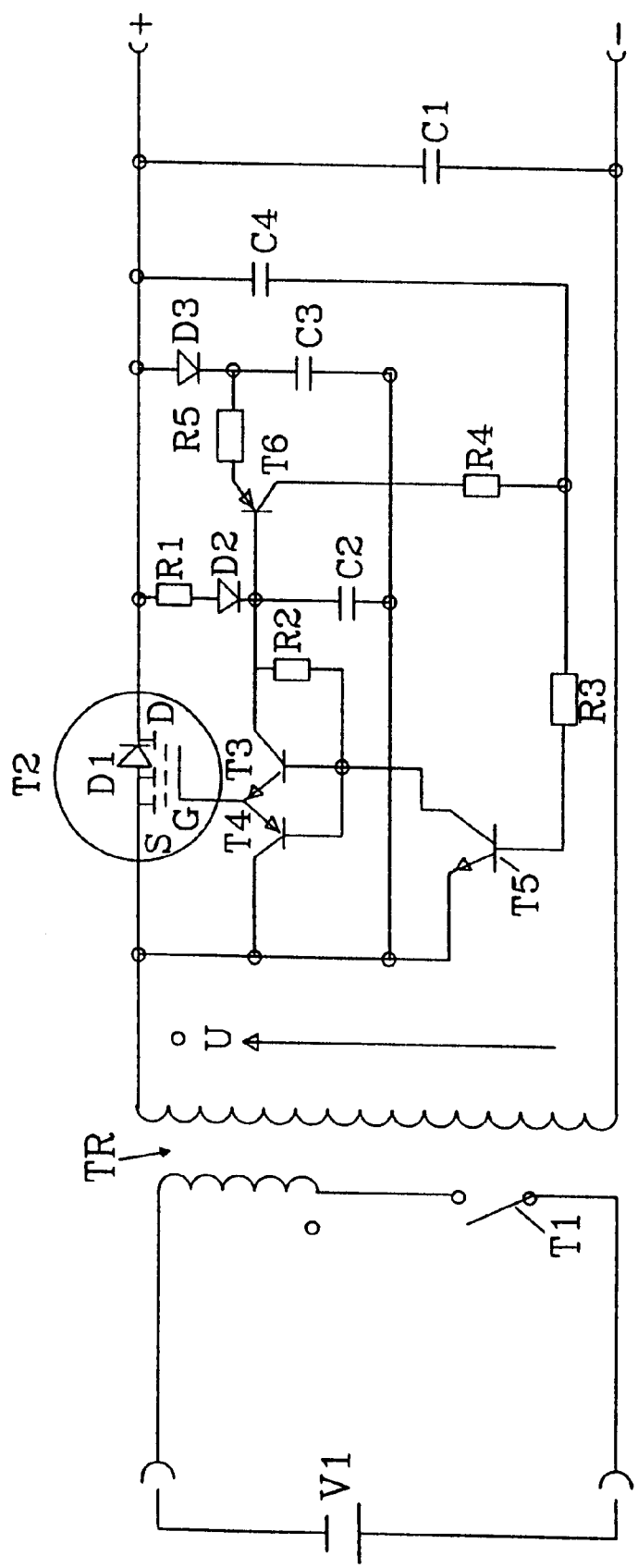
FIG. 1 shows a fly-back DC/DC converter with an example embodiment of a control arrangement in accordance with the invention.

FIG. 1 shows a fly-back DC/DC converter with an example embodiment of a control arrangement in accordance with the invention. The converter comprises a transformer TR having a primary winding connected in series with a primary switch T1 to output terminals of a schematically illustrated DC voltage source V1, and a secondary winding connected in series with a MOSFET T2 to an output capacitor C1 for generating an output DC voltage. The MOSFET T2 is used as a synchronous rectifier and is controlled in accordance with the invention to improve the efficiency of the converter.

In a manner known per se, the MOSFET T2 comprises a source S, a drain D, and a gate G as well as a body diode D1 connected with its anode to the source S and with its cathode to the drain D of the MOSFET T2. In the example embodiment shown in FIG. 1, the drain D of the MOSFET T2 is connected to the source S of the MOSFET T2 via a resistor R1 in series with a diode D2 and a capacitor C2. Also, the drain D is connected to the source S via a diode D3 in series with a capacitor C3.

The interconnection point between the diode D2 and the capacitor C2 is connected to the collector of a transistor T3 whose emitter is connected to the gate G of the MOSFET T2 and to the emitter of a transistor T4 whose collector is connected to the source S of the MOSFET T2. The bases of the transistors T3 and T4 are interconnected and connected via a resistor R2 to the collector of the transistor T3. The interconnected bases of the transistors T3 and T4 are also connected to the collector of a transistor T5 whose emitter is connected to the source S of the MOSFET T2.

The base of the transistor T5 is connected via resistor R3 in series with a capacitor C4 to the drain D of the MOSFET T2. The interconnection point between the resistor R3 and the capacitor C4 is connected via a resistor R4 to the collector of a transistor T6 whose emitter is connected to the interconnection point between the diode D3 and the capacitor C3 via a resistor R5 and whose base is connected to the interconnection point between the diode D2 and the capacitor C2.

As mentioned above, the switch T1 is the so-called primary switch of the fly-back converter. When the switch T1 is on, magnetic energy is stored in the transformer TR. The voltage U across the secondary winding of the transformer TR is negative. When the primary switch T1 goes off, the voltage U will be positive and energy will be transferred via the MOSFET T2 to the output capacitor C1.

The transistors T3 and T4 are two emitter-followers that quickly can charge/discharge the gate G of the MOSFET T2. The transistor T5 turns the MOSFET T2 on and off via the emitter-followers T3 and T4. The transistor T5 is turned on and off by the capacitor C4. When the primary switch T1 turns on, the MOSFET T2 is still conducting, but the current through the MOSFET T2 reverses its direction when the voltage U starts to fall. The transistor T5 senses this change via the capacitor C4 and turns off the MOSFET T2. By charging the capacitor C4 via the resistor R4, the time when the transistor T5 turns on, i.e., when the MOSFET T2 turns off, can be varied.

The transistor T6 senses the voltage difference between the voltage across the capacitor C3 and the voltage across the capacitor C2. The capacitor C3 is charged to the peak voltage of the voltage U including any transient emanating from a non-desired turn-off current from the MOSFET T2, while the capacitor C2 is charged to the voltage U excluding any transients since the resistor R1 filters out any transients.

When the voltage difference between the capacitors C3 and C2 exceeds the base-emitter voltage of the transistor T6, the transistor T6 will conduct and via the resistor R4 set the off-time of the transistor T5, i.e. the on-time of the MOSFET T2, so that the voltage difference between the capacitors C3 and C2 will be smaller than a few volts after a number of switch cycles With reference to FIGS. 2A–2D, the operation of the converter illustrated in FIG. 1 will now be described in more detail.

Figure 2A:
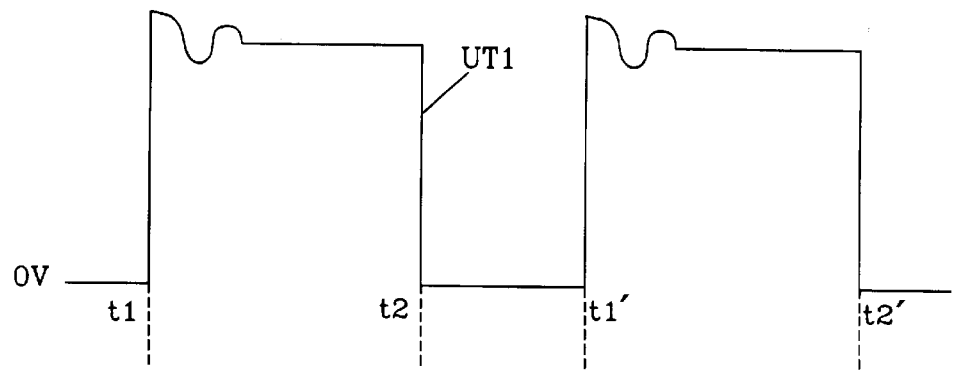
FIGS. 2A–2D are diagrams illustrating different signals in the example embodiment in FIG. 1.

FIG. 2A illustrates a couple of cycles of the voltage UT1 across the primary switch T1. The primary switch T1 is supposed to be on from the beginning and is supposed to be turned off at times t1 and t1' and turned on at times t2 and t2'. When the primary switch T1 is on, the capacitor C2 is charged via the resistor R1 in series with the diode D2, and the capacitor C3 is charged via the diode D3. At time t1 when the primary switch T1 turns off, the body diode D1 of the MOSFET T2 begins to conduct to charge the output capacitor C1.

Figure 2B:
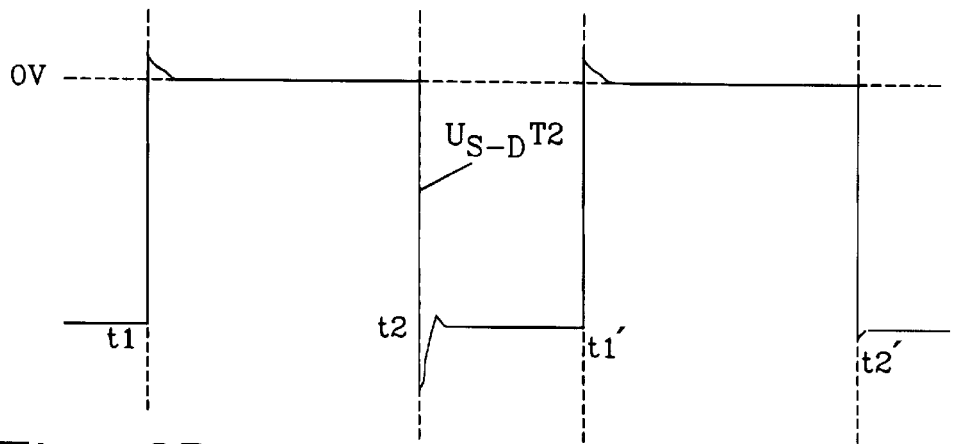

If FIG. 2B, the source-drain voltage US-DT2 of the MOSFET T2 is illustrated. Base current will be supplied to the transistor T3 via the resistor R2, and the gate G of the MOSFET T2 will be charged causing the MOSFET T2 to become saturated.

Figure 2C:
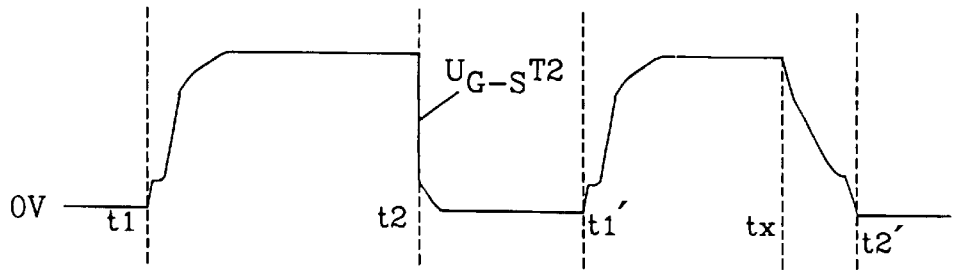

FIG. 2C illustrates the gate-source voltage UG-ST2 of the MOSFET T2. At time t2, the primary switch T1 turns on again. When the voltage across the MOSFET T2 changes polarity at time t2 as illustrated in FIG. 2B, the transistor T5 becomes saturated via the capacitor C4 and the resistor R3, and the MOSFET T2 goes off. However, due to the fact that it takes some time to discharge the gate of the MOSFET T2 after that the transistor T5 is turned on, the MOSFET T2 will turn off a little late causing a reverse current to flow from the output capacitor C1 back into the transformer TR. This reverse current causes a voltage transient across the MOSFET T2 when the MOSFET T2 is off.

That transient, which is illustrated in FIG. 2B at time t2, charges the capacitor C3 via the diode D3 to a voltage that is higher than the voltage across the capacitor C2, causing the transistor T6 to start conducting. The collector current from the transistor T6 then sets the time when the transistor T5 starts to draw gate charge from the gate G of the MOSFET T2. Towards the end of the next off-period of the primary switch T1, i.e. towards time t2', almost all gate charge has been drawn from the gate G of the MOSFET T2 before the primary switch T1 goes on again at time t2' as illustrated in FIG. 2C.

When the primary switch T1 turns on at time t2', the MOSFET T2 is prepared, i.e., most of the gate charge has been drawn off and the MOSFET T2 is not fully conducting. Thus, no reverse current spike will appear across the MOSFET T2 at time t2' as apparent from FIG. 2B.

Figure 2D:
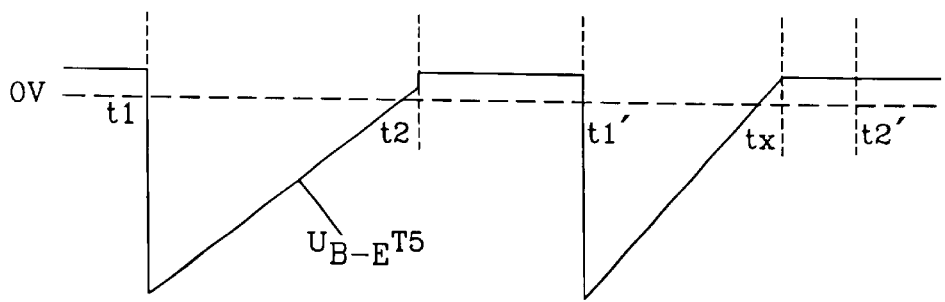

FIG. 2D illustrates the base-emitter voltage UB-ET5 of the transistor T5. At time t1, the voltage change across the secondary winding of the transformer TR turns off the transistor T5 via the capacitor C4 and the resistor R3. Hereby, the gate G of the MOSFET T2 is charged via the resistor R2 and the transistor T3. Between times t1 and t2, the base-emitter voltage UB-ET5 of the transistor T5 is reversed and, consequently, the transistor T5 is not conducting.

When the primary switch T1 is turned on at time t2, the reverse voltage across the MOSFET T2 turns on the transistor T5 and turns off the MOSFET T2. Between times t2 and t1', the base of the transistor T5 is forward biased. Therefore, the gate G of the MOSFET T2 is low, and the MOSFET T2 is not conducting as is apparent from FIG. 2C.

For the next period, i.e., the time between t1' and t2', the voltage difference between the capacitors C2 and C3, caused by the transient appearing at time t2, turns on the transistor T6 causing the capacitor C4 to be discharged via the resistor R4. As a result, the transistor T5 will start conducting at a time tx before time t2' as indicated in FIG. 2D.

Also at time tx, via the transistor T4, the transistor T5 will begin to draw gate charge out of the gate G of the MOSFET T2 to turn off the MOSFET T2 earlier than time t2' as illustrated in FIG. 2C.

Thus, due to the earlier turn-off of the MOSFET T2, the transient or current spike that appeared at time t2 will not appear at time t2' as illustrated in FIG. 2B. However, should a current spike be present also at time t2', the MOSFET T2 will be turned off earlier towards the end of its next on-period. As should be apparent from the above, no control signals have to be transferred from the primary side of the converter to control the MOSFET on the secondary side.

What is claimed is:

1. Apparatus for use in a fly-back DC/DC converter, comprising:

a MOSFET used as a synchronous rectifier and which is coupled to a secondary winding of a transformer for generating an output DC voltage, where the MOSFET is repetitively turned on and off in response to turning off and on of a primary switch coupled to a primary winding of the transformer and to an input DC voltage source;

a first transistor coupled to a gate of the MOSFET for controlling when the MOSFET is turned on and off;

a first capacitor coupled between a drain of the MOSFET and the first transistor for turning the first transistor on and off; and a second capacitor coupled to the MOSFET drain and arranged to be charged to a peak voltage of a transient caused by a reverse current generated when the MOSFET is turned off, wherein the charged second capacitor causes a voltage across the first capacitor to change so that the first transistor turns on to decrease a next on-period for the MOSFET.

2. The apparatus in claim 1, further comprising:

a third capacitor coupled to the drain of the MOSFET being charged to voltage less than the peak transient voltage.

3. The apparatus in claim 2, further comprising:

a second transistor coupled to the MOSFET drain, wherein when a voltage across the third capacitor is less than a voltage across the second capacitor, the second transistor conducts causing the first transistor to turn off, which causes the MOSFET to turn on.

4. The apparatus in claim 3, wherein the second transistor is coupled to and charges the first capacitor.

5. The apparatus in claim 3, wherein when the second transistor starts conducting, the first transistor starts to draw gate charge from the gate of the MOSFET.

6. The apparatus in claim 5, wherein before the primary switch turns on again, the first transistor has removed most or all of the gate charge.

7. The apparatus in claim 1, further comprising:

two emitter-follower transistors and coupled to a gate of the MOSFET and to the first transistor for rapidly charging and discharging the gate of the MOSFET.

8. The apparatus in claim 1, wherein the first transistor is configured such that when the second capacitor is charged by a transient, the first transistor draws current from the MOSFET gate.

9. The apparatus in claim 8, wherein before the primary switch turns on again, the first transistor has removed most or all of the gate charge.

10. The apparatus in claim 1, wherein the output DC voltage is a generated across an output capacitor.

* * * * *